United States Patent [19]

Olin et al.

[11] Patent Number: 4,487,062
[45] Date of Patent: Dec. 11, 1984

[54] MASS FLOWMETER

[75] Inventors: John G. Olin, Carmel Valley; David M. Korpi, Monterey, both of Calif.

[73] Assignee: Sierra Instruments, Inc., Carmel Valley, Calif.

[21] Appl. No.: 480,231

[22] Filed: Mar. 30, 1983

[51] Int. Cl.³ .............................................. G01F 1/68
[52] U.S. Cl. ........................................ 73/202; 73/204
[58] Field of Search ........................... 73/202, 204, 324

[56] References Cited

U.S. PATENT DOCUMENTS

| 1,252,656 | 1/1918 | Breen | 73/324 |
| 2,586,060 | 2/1952 | Kronberger | 73/202 |
| 2,813,237 | 11/1957 | Fluegel | 73/204 X |
| 3,187,569 | 6/1965 | Los | 73/204 X |
| 3,613,448 | 10/1971 | Benson et al. | 73/204 X |
| 3,938,384 | 2/1976 | Blair | 73/204 |
| 4,016,759 | 4/1977 | Baker | 73/204 |
| 4,098,119 | 7/1978 | Coats | 73/204 X |

FOREIGN PATENT DOCUMENTS 1053201  3/1959  Fed. Rep. of Germany ........ 73/204

Primary Examiner—Herbert Goldstein
Attorney, Agent, or Firm—Michael L. Harrison

[57] ABSTRACT

An improved mass flowmeter of the type having a primary passage for the fluid whose flow rate is to be measured, a sensor tube which serves as a secondary passage for the fluid and is connected to the primary passage at upstream and downstream locations, and a pair of resistance wire coils surrounding the sensor tube and connected to a bridge circuit in which the resistance differential between the wire coils is proportional to the fluid flow rate. The sensor tube is a straight tube displaced from the primary passage and accessible at its ends for cleaning. The wire coils and the corresponding portion of the sensor tube are surrounded by an evacuated enclosure to prevent convection effects between the adjacent coils, to maximize the response time of the coils to changes in fluid flow rate, and to reduce conduction losses.

6 Claims, 3 Drawing Figures

MASS FLOWMETER

BACKGROUND OF THE INVENTION

This invention relates to mass flowmeters of the type in which the mass rate of flow of the fluid is measured by sensing the temperature differential in the flowing fluid caused by the addition of heat at a generally constant rate. Typical mass flowmeters of this type are disclosed in U.S. Pat. No. 2,729,976 to Laub and U.S. Pat. No. 3,938,384 to Blair. One conventional version of this type of flowmeter utilizes a sensor tube of substantially smaller diameter than the main flow path which is connected to the main flow path at an upstream and a downstream location. Wrapped around the sensor tube is a pair of temperature-sensitive resistance coils which are part of a bridge circuit. A DC power supply applies current to the resistance coils and the heat generated thereby is transferred to the fluid passing through the sensor tube. As the fluid flows from its upstream to its downstream locations within the sensor tube, the electronic circuit, which was initially balanced at zero fluid flow, becomes unbalanced. The unbalance of the electronic circuit is directly proportional to the mass flow rate of the fluid passing through the sensor tube and thus to the mass flow rate through the primary flow path.

Conventional flowmeters of this type suffer from several deficiencies. Because of the typically small internal diameter of the sensor tube, it is subject to contamination by particulate matter in the gas stream. Such extraneous deposits can cause serious measurement errors. Some flowmeters of this type have their tubes integrally connected to the primary flow passage so that the flowmeter must be removed from the flow line in order to clean the sensor tube. Most sensor tubes have a "U", rather than a straight, configuration. Some of these are removable from the primary flow passage by first removing the electronics enclosure, but, because of their "U" geometry, they are very difficult to thoroughly clean either by insertion of a wire or by purging. In addition, because either two separate resistance coils or a single center-tapped sensor coil is utilized, the coils are influenced by heat convection from one another. If the attitude of the flowmeter is other than horizontal, the higher coil will be influenced by upward external heat convection from the lower coil, thereby giving an erroneous reading of flow rate. The Blair patent has attempted to eliminate this deficiency by surrounding the coils with insulating material of open cell foam. However, because the foam material also absorbs heat from the resistance coils, and thus away from the fluid flowing within the sensor tube, the response time of the bridge circuit to changes in fluid flow rate is increased and conductive heat losses occur.

SUMMARY OF THE INVENTION

The invention is an improvement to the above-described type of mass flowmeters and includes a first portion having a primary conduit for attachment to the main flow line carrying the fluid whose flow rate is to be measured, a second portion having a straight sensor tube which is in fluid communication at upstream and downstream locations with the primary conduit, and an evacuated enclosure surrounding the resistance wires and a portion of the sensor tube.

The portion of the mass flowmeter containing the sensor tube is displaced from the primary conduit. Upstream and downstream access ports permit the straight sensor tube to be easily and separately cleaned or purged without disconnecting the flowmeter from the main flow line or the sensor tube from the flowmeter. The enclosure surrounding the resistance wires and the portion of the sensor tube, which is either evacuated or partially filled with a gas of low thermal conductivity, eliminates external convection effects between the two resistance wires, maximizes the response time of the bridge circuit of which the coils form a part, and reduces conductive heat losses.

For a fuller understanding of the nature and advantages of the invention, reference should be made to the ensuing detailed description taken in conjunction with the accompanying drawings.

DESCRIPTION OF THE PREFERRED EMBODIMENTS

Figure 1:
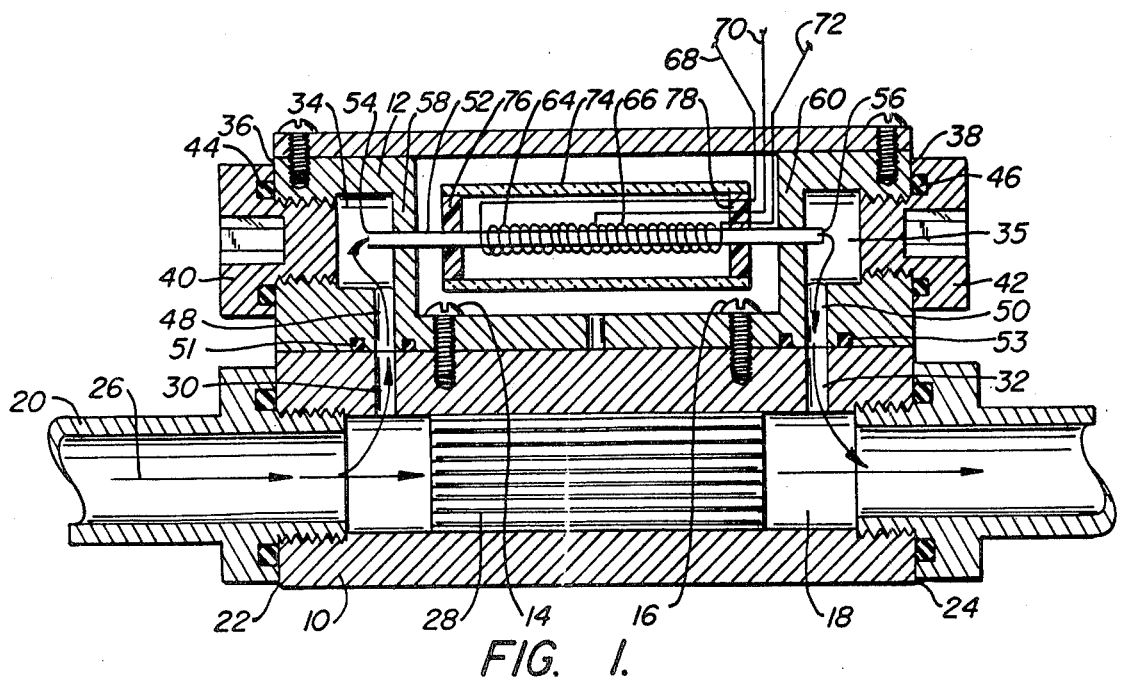
FIG. 1 is a sectional view of the flowmeter.

As illustrated in FIG. 1, the mass flowmeter comprises a lower portion 10 and an upper portion 12 which are secured together by means of bolts 14 and 16. The lower portion 10 of the flowmeter has a central cylindrical bore 18 which serves as the primary passage for the fluid whose flow rate is to be measured. The lower portion 10 of the flowmeter is connected to the main flow line 20 at its upstream end 22 and its downstream end 24, the direction of flow of the fluid being indicated by arrow 26. Located within the central bore 18 is a laminar flow element 28. Extending perpendicularly outwardly and opening into central bore 18 are two bores 30, 32 near the upstream end and downstream end, respectively.

The upper portion 12 of the flowmeter, which contains the sensor tube as the secondary passage for the fluid, includes a cavity 34 near the upstream end and a cavity 35 near the downstream end. The cavities 34 and 35 are closed at both ends by means of plugs 40, 42, which are threaded into ends 36, 38, respectively of upper portion 12, and sealed by means of O-rings 44, 46. Upper portion 12 includes openings 48, near the upstream end, and 50 near the downstream end, both of which extend perpendicularly outwardly from cavities 34 and 35 and communicate with bores 30, 32, respectively, of lower portion 10. A secure seal between upper portion 12 and lower portion 10 is provided by O-rings 51, 53 surrounding the points of fluid communication of the two flowmeter portions.

Located within upper portion 12 of the flowmeter is a sensor tube 52 which is supported and sealed at its upstream end 54 and its downstream end 56 by by the walls 58, 60 near cavities 34 and 35, respectively. The fluid entering from bore 30 into upper portion 12 will pass only into the interior of sensor tube 52. The sensor tube 52 has a substantially lesser diameter than the diameter of central bore 18 so that only a relatively small percentage of the total flow through main flow line 26 passes through the secondary passage and sensor tube 52. Sensor tube 52 is preferably a thin-walled stainless steel tubing such as commercially available hypodermic tubing.

Figure 2:
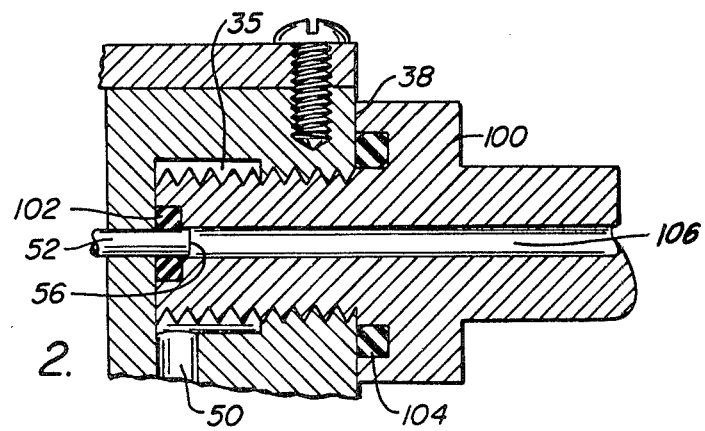
FIG. 2 is a sectional view of a fitting secured to the flowmeter for cleaning the sensor tube.

The use in the present invention of a straight sensor tube 52 which is parallel to primary flow passage of the lower portion 10 of the flowmeter, but displaced from it, allows the sensor tube 52 to be cleaned without disconnecting the flowmeter from the main flow line 26. Cleaning can be accomplished by first removing plugs 40, 42 from the ends of upper portion 12, thus providing access to the interior of sensor tube 52, and then either manually cleaning by insertion of a straight wire into sensor tube 52 or by threading a special tube fitting, in place of plugs 40 and 42, and purging the sensor tube with a liquid or gas. Referring to FIG. 2, the special fitting 100 for cleaning the sensor tube is shown threaded into downstream end 38 of the upper portion 12 of the flowmeter. The fitting 100 includes an O-ring 102 for sealing the end of the fitting around end 56 of sensor tube 52 and an O-ring 104 for sealing the fitting to the exterior of upper portion 12. The fitting 100 has a central opening 106 which communicates with the interior of sensor tube 52. In operation a similar fitting is threaded into upstream end 36 of the upper portion 12 of the flowmeter and a gas or liquid from an external source (not shown) is forced under pressure through the opening 106 into sensor tube 52 to purge it of contaminants. The O-ring seals 102, 104 between the fitting 100 and end 38 prevent the cleaning gas or liquid from entering cavities 34, 35 and flow line 26.

Wrapped around the exterior of sensor tube 52 are two coils 64, 66 of temperature-sensitive resistance wire. The wire used for coils 64, 66 may be any suitable temperature-sensitive material, such as iron-nickel alloy. Electrical lead 68 is connected to one end of coil 64, electrical lead 72 is connected to one end of coil 66, and electrical lead 70 is center-tapped to the connection between coils 64 and 66. Thus, coils 64, 66 are in actuality a single coil with a lead 70 connected at its center. The leads 68, 70, 72 connect with the electrical circuitry (not shown) of the flowmeter. It should also be noted that the coils 64, 66 shown in FIGS. 1 and 3 are actually in contact with the sensor tube 52, even though the drawings, for reasons of clarity, illustrate them slightly displaced from the sensor tube.

Surrounding coils 64, 66 and the nearby portion of sensor tube 52 is an enclosure comprising cylinder 74 and end walls 76, 78. The cylinder 74 is preferably a glass tube. The end walls 76, 78 may be formed from glass or epoxy to provide a secure seal between the inner wall of the cylinder 74 and the outer wall of sensor tube 52 at the respective upstream and downstream ends. The electrical leads 68, 70, 72 connected to coils 64, 66 extend through the glass or epoxy material of end wall 78 and up through the opening in the top wall of upper portion 12 of the flowmeter. The enclosure in the preferred embodiment defined by cylinder 74 and epoxy end walls 76, 78 is evacuated and sealed. Alternatively, a gas of low thermal conductivity, such as krypton or boron, can partially fill the enclosure so that a pressure closer to atmospheric can be maintained within the enclosure without substantially increasing the heat convection effects between the coils 64, 66.

While the previously described feature of free accessibility to the sensor tube for cleaning with the use of fitting 100 has been described with respect to the particular embodiment of a sensor tube surrounded by an evacuated enclosure, it should be apparent that this feature of the invention is equally compatible with flowmeters utilizing other types of sensing means.

Figure 3:
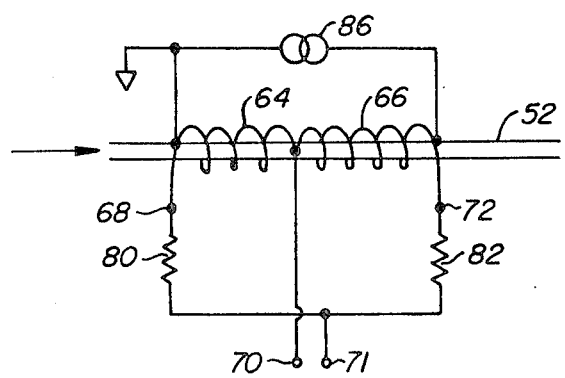
FIG. 3 is a partial schematic diagram of the circuit for the flowmeter.

Referring now to FIG. 3, the basic principle of measurement of flow rate through the flowmeter, which is typical of mass flowmeters of this type, can be understood. The coils 64, 66 which are wrapped around sensor tube 52 form part of an electronic circuit which includes resistors 80, 82. Located in the circuit across coils 64 and 66 is a constant current source 86. In operation, current flows through coils 64 and 66. The resistance coils 64, 66 thereby generate heat and the electrical resistance of each coil is raised. As fluid enters the upstream end of sensor tube 52 it carries the heat generated by coil 64 downstream, thereby creating a temperature differential and a corresponding differential in electrical resistance between resistance coils 64, 66. This resistance differential generates an output voltage across leads 70 and 71 which is directly proportional to the rate of fluid flow through the sensor tube 52 and thus through the main flow line 26.

Because the resistance coils 64, 66 are temperature-sensitive and their electrical resistance is directly related to their temperature, they are very sensitive to external temperature effects. Thus if heat generated by one coil is transferred to the other coil erroneous measurements will result. This occurs in conventional mass flowmeters if the sensor tube is not oriented horizontally because upward convection of heat from the lower coil increases the temperature of the higher coil. U.S. Pat. No. 3,938,384 to Blair is directed to this problem and discloses surrounding both coils with open cell foam material to insulate them. However, because the open cell foam material has thermal mass, it absorbs a portion of the heat generated by the coils. The present invention, with the use of an evacuated enclosure surrounding the coils, not only eliminates convection effects between the coils, but also eliminates conductive transfer of heat away from the sensor tube. Since more of the heat generated by the coils is transferred directly to the sensor tube and thus to the fluid going through it, the present invention maximizes the response time of the electronic circuit to changes in fluid flow rate and improves measurement accuracy. While the use of a substantially evacuated enclosure is the preferred embodiment of the present invention, it is also possible to use a gas of low thermal conductivity within the enclosure, while still retaining a high response time.

While the preferred embodiments of the present invention have been illustrated in detail, it should be apparent that modifications and adaptations of those embodiments will occur to those skilled in the art. However, it is to be expressly understood that such modifications and adaptations are within the sphere and scope of the present invention as set forth in the following claims.

What is claimed is:

1. A mass flowmeter for sensing the fluid flow rate in a flow line comprising:
    means defining a primary passage for the flow of the gas;
    means defining a secondary passage for the flow of the gas, the secondary passage communicating with the primary passage at an upstream and a downstream location, said secondary passage further comprising a straight sensor tube displaced from and generally parallel with the primary passage;
    means proximate the secondary passage for applying heat at a relatively constant rate to the fluid flowing through the secondary passage;

means connected to the heat-applying means for measuring the temperature differential of the fluid flowing through the secondary passage caused by the addition of heat;

removable means proximate the ends of the sensor tube for providing access to the sensor tube without removing the primary passage means from the flowline; and means engageable with the sensor tube when the access providing means is removed for cleaning the interior of the sensor tube, said cleaning means including means for sealing the interior of the sensor tube from fluid communication with the primary passage.

2. The mass flowmeter according to claim 1 wherein said cleaning means includes means for introducing a purging fluid into the interior of the sensor tube.

3. The mass flowmeter according to claim 1 wherein said removable access providing means further comprises means for providing access to either end of the sensor tube.

4. In a mass flowmeter of the type comprising a primary conduit for the fluid whose flow rate is to be measured, a sensor tube of substantially lesser diameter than the primary conduit and communicating with the primary conduit at an upstream and a downstream location so that a portion of the fluid passes through the sensor tube, at least two resistance coils wrapped around the sensor tube, a power supply connected to the coils for heating the coils, and a bridge circuit including the resistance coils for sensing the differential resistance in the coils and therewith the rate of flow of the fluid flowing through the sensor tube, an improvement to the flowmeter wherein the sensor tube is substantially straight, parallel to and displaced from the primary conduit, and including removable means proximate the ends of the sensor tube for providing access to the sensor tube without removing the primary conduit from the path of the fluid whose flow rate is to be measured, and means engageable with the removable means for cleaning the interior of the sensor tube, said cleaning means further comprising means for sealing the interior of the sensor tube from fluid communication with the primary conduit, whereby fluid may flow through the primary conduit while the sensor tube is being cleaned.

5. The improvement according to claim 4 wherein said cleaning means includes means for introducing a purging fluid into the interior of the sensor tube.

6. The improvement according to claim 4 wherein said access providing means includes means for providing access to either end of the sensor tube.

* * * * *